United States Patent
Aker

(10) Patent No.: US 7,057,550 B1
(45) Date of Patent: Jun. 6, 2006

(54) SYSTEM AND METHOD FOR CALIBRATING A VEHICULAR TRAFFIC SURVEILLANCE DOPPLER RADAR

(75) Inventor: John L. Aker, Estero, FL (US)

(73) Assignee: Applied Concepts, Inc., Plano, TX (US)

( * ) Notice: Subject to any disclaimer, the term of this patent is extended or adjusted under 35 U.S.C. 154(b) by 0 days.

(21) Appl. No.: 11/059,474

(22) Filed: Feb. 16, 2005

(51) Int. Cl.
*G01S 7/40* (2006.01)
*G01S 13/58* (2006.01)

(52) U.S. Cl. .................. 342/174; 342/82; 342/89; 342/104; 342/109; 342/118; 342/128; 342/165; 342/173; 342/175; 342/194; 342/195; 342/196

(58) Field of Classification Search .......... 342/89–116, 342/118, 127–147, 165–175, 192–197, 27, 342/28, 70–72, 82–88
See application file for complete search history.

(56) References Cited

U.S. PATENT DOCUMENTS

| | | |
|---|---|---|
| 3,680,085 A | 7/1972 | Del Signore |
| 3,750,172 A | 7/1973 | Tresselt |
| 3,760,414 A | 9/1973 | Nicolson |
| 3,761,908 A | 9/1973 | Gehman |
| 3,898,655 A | 8/1975 | Tresselt |
| 4,003,049 A | 1/1977 | Sterzer et al. |
| 4,052,722 A | 10/1977 | Millard |
| 4,072,945 A | 2/1978 | Katsumata et al. |
| 4,123,719 A * | 10/1978 | Hopwood et al. .......... 342/174 |
| 4,214,243 A | 7/1980 | Patterson |
| 4,219,878 A | 8/1980 | Goodson et al. |
| 4,282,524 A | 8/1981 | Eymann et al. |
| 4,435,712 A * | 3/1984 | Kipp .......................... 342/128 |
| 4,673,937 A | 6/1987 | Davis |
| 4,740,045 A | 4/1988 | Goodson et al. |
| 4,806,935 A | 2/1989 | Fosket et al. |
| 4,968,968 A * | 11/1990 | Taylor ........................ 342/174 |
| 5,049,885 A | 9/1991 | Orr |
| 5,083,129 A | 1/1992 | Valentine et al. |
| 5,134,406 A | 7/1992 | Orr |
| 5,151,701 A | 9/1992 | Valentine et al. |

(Continued)

FOREIGN PATENT DOCUMENTS

FR    2747788 A   * 10/1997

OTHER PUBLICATIONS

Skolnik, Merrill I. "Introduction to Radar Systems," 1962, pp. 98–99, McGraw-Hill Book Company, Inc., New York.

(Continued)

*Primary Examiner*—Bernarr E. Gregory
(74) *Attorney, Agent, or Firm*—Scott T. Griggs; Griggs Bergen LLP

(57) ABSTRACT

A system and method for calibrating a vehicular traffic surveillance Doppler radar are disclosed. In one embodiment, a modulation circuit portion generates double-modulated FM signals. An antenna circuit portion transmits the double-modulated FM signals to a target and receives reflected double-modulated FM signals therefrom. A calibration circuit portion responds to the reflected double-modulated FM signals by sending a calibration signal to the modulation circuit. The calibration signal is indicative of a relationship between a first range measurement derived from phase angle measurements associated with the reflected double-modulated FM signals and a second range measurement derived from speed and time measurements associated with the reflected double-modulated FM signals.

32 Claims, 6 Drawing Sheets

U.S. PATENT DOCUMENTS

| | | |
|---|---|---|
| 5,177,691 A | 1/1993 | Welles et al. |
| 5,206,651 A | 4/1993 | Valentine et al. |
| 5,270,720 A * | 12/1993 | Stove .................. 342/174 |
| 5,300,932 A | 4/1994 | Valentine et al. |
| 5,305,007 A | 4/1994 | Orr et al. |
| 5,315,302 A | 5/1994 | Katsukura et al. |
| 5,347,120 A | 9/1994 | Decker et al. |
| 5,525,996 A | 6/1996 | Aker et al. |
| 5,528,245 A | 6/1996 | Aker et al. |
| 5,528,246 A | 6/1996 | Henderson et al. |
| 5,563,603 A | 10/1996 | Aker et al. |
| 5,570,093 A | 10/1996 | Aker et al. |
| 5,691,724 A | 11/1997 | Aker et al. |
| 5,818,383 A | 10/1998 | Stockburger et al. |
| 5,861,837 A | 1/1999 | Richardson et al. |
| 5,886,663 A * | 3/1999 | Broxon et al. .......... 342/165 |
| 6,008,752 A | 12/1999 | Husk et al. |
| 6,121,917 A | 9/2000 | Yamada |
| 6,121,919 A * | 9/2000 | Ameen et al. .......... 342/174 |
| 6,198,427 B1 | 3/2001 | Aker et al. |
| 6,266,627 B1 | 7/2001 | Gatsonides |
| 6,384,768 B1 * | 5/2002 | Kai .................. 342/128 |
| 6,417,796 B1 | 7/2002 | Bowlds |
| 6,501,418 B1 | 12/2002 | Aker |
| 6,580,386 B1 | 6/2003 | Aker et al. |
| 6,646,591 B1 | 11/2003 | Aker et al. |
| 6,744,379 B1 | 6/2004 | Aker et al. |
| 6,831,593 B1 | 12/2004 | Aker et al. |
| 6,831,595 B1 * | 12/2004 | Isaji .................. 342/173 |

OTHER PUBLICATIONS

U.S. Appl. No. 11/059,476, filed Aug. 10, 2005, Aker.
U.S. Appl. No. 11/059,199, filed Jul. 26, 2005, Aker.

* cited by examiner

SYSTEM AND METHOD FOR CALIBRATING A VEHICULAR TRAFFIC SURVEILLANCE DOPPLER RADAR

CROSS-REFERENCE TO RELATED APPLICATIONS

This application discloses subject matter related to the subject matter disclosed in the following commonly owned, co-pending patent applications: (1) "Vehicular Traffic Surveillance Doppler Radar System," filed on Feb. 16, 2005, application Ser. No. 11/059,476, in the name of John L. Aker; and (2) "Modulation Circuit for a vehicular Traffic Surveillance Doppler Radar System," filed on Feb. 16, 2005, application Ser. No. 11/059,199, in the name of John L. Aker; both of which are hereby incorporated by reference for all purposes.

TECHNICAL FIELD OF THE INVENTION

This invention relates, in general, to police Doppler radar systems and, in particular, to a system and method for calibrating a vehicular traffic surveillance Doppler radar.

BACKGROUND OF THE INVENTION

The role of radar in traffic safety enforcement is widespread throughout the United States and the principal tool for police traffic surveillance is Doppler radar. In a police Doppler radar system, an emitted microwave frequency signal is reflected from a target vehicle, causing a change in the frequency of the signal in proportion to a component of the velocity of the target vehicle. The Doppler radar system measures the frequency differential and scales the measurement to miles per hour, for example, in order to display the velocity of the target vehicle to a policeman or other Doppler radar system operator. Using the existing frequency differential scheme, conventional police Doppler radar systems are capable of a high degree of accuracy with regard to vehicle speed measurements in environments having one target vehicle.

It has been found, however, that the existing police Doppler radar systems are not necessarily successful in environments having multiple vehicles in position to reflect the radar signal. In particular, identification of the vehicle whose speed is being displayed when multiple vehicles are in a position to reflect the radar signal has proven difficult due to "look-past error," which occurs in situations where the intended target vehicle in the foreground has a significantly smaller radar cross-section than an unintended target vehicle in the background. Accordingly, further improvements are warranted in the field of traffic surveillance Doppler radar systems.

SUMMARY OF THE INVENTION

A system and method are disclosed that provide for calibrating a vehicular traffic surveillance Doppler radar which substantially eliminates look-past error by determining the range and speed of vehicles in multiple vehicle environments. The Doppler radar self-calibrates a frequency versus voltage characteristic associated with the range determining functionality of the radar.

In one embodiment, a modulation circuit portion generates modulated FM signals, such as double-modulated FM signals. An antenna circuit portion transmits the modulated FM signals to a target and receives reflected modulated FM signals therefrom. A calibration circuit portion responds to the reflected modulated FM signals by sending a calibration signal to the modulation circuit. The calibration signal is indicative of a relationship between a first range measurement derived from phase angle measurements associated with the reflected modulated FM signals and a second range measurement derived from speed and time measurements associated with the reflected modulated FM signals.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1A:
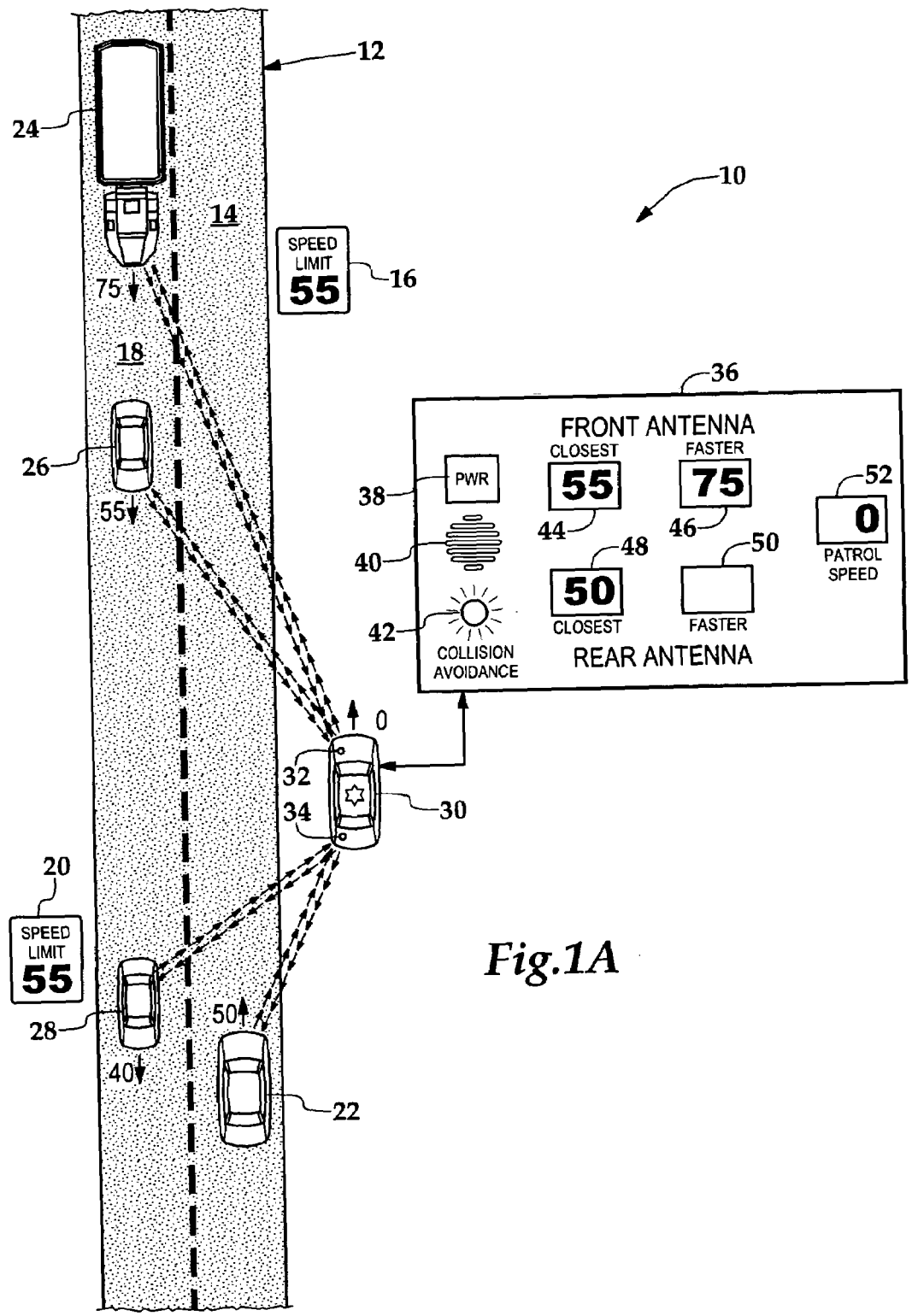
FIG. 1A depicts a schematic illustration of a multiple vehicle environment wherein one embodiment of a system for traffic surveillance is being utilized.

Referring initially to FIG. 1A, therein is depicted an environment 10 having multiple vehicles wherein one embodiment of the vehicular traffic surveillance Doppler radar system is being utilized. A highway 12 includes a northbound lane 14 having a speed limit of 55 mph as depicted by speed limit sign 16 and a southbound lane 18 having a speed limit of 55 mph as depicted by speed limit sign 20. A vehicle 22 is traveling in the northbound lane 14 at a speed of 50 mph as indicated by the northbound arrow and number "50" proximate to the front portion of the vehicle 22. Vehicles 24, 26, and 28 are traveling in the southbound lane 18 at speeds of 75 mph, 55 mph, and 40 mph, respectively. A patrol vehicle 30 equipped with a vehicular traffic surveillance Doppler radar system is stationary and facing north in a location that is proximate to the northbound lane 14. The vehicle 22 is approaching the patrol vehicle 30 quickly. Additionally, with respect to the position of patrol vehicle 30, vehicles 24 and 26 are positioned such that conditions are present for look-past error.

A front-facing antenna 32 and a rear-facing antenna 34 are mounted on the patrol vehicle 30 for surveying traffic. A control panel 36 is associated with the patrol vehicle 30 and preferably secured to the dashboard in the interior of the patrol vehicle 30. The control panel 36 includes a power button 38, a speaker 40, and a collision avoidance indicator 42. Displays 44 and 46 indicate the speeds (in mph) of the closest vehicle and the faster vehicle, respectively, associated with the front-facing antenna 32. Similarly, displays 48 and 50 indicate the speeds (in mph) of the closest vehicle and the faster vehicle, respectively, associated with the rear-facing antenna 34. In instances where only one vehicle is associated with the rear-facing antenna 34, the display 50 is empty. A display 52 indicates the speed (in mph) of the patrol vehicle 30. It should be appreciated that the displays 44–52 may either be dedicated to displaying the indicators discussed hereinabove or configurable to provide other types of indications. For example, a display may be configured to provide a history of the speed of a particular targeted vehicle.

As illustrated, the patrol vehicle 30 is monitoring the traffic in both the northbound lane 14 and southbound lane 18. With regard to both antennas 32 and 34, the vehicular traffic surveillance Doppler radar system is in a stationary, closest and faster, approaching only mode. In this mode, the police vehicle 30 is stationary and monitoring the speeds of both the closest and faster vehicles approaching the police vehicle 30. It should be appreciated, however, that other modes of operation are within the teachings of the present invention. By way of example, the following table provides a non-exhaustive matrix of the more common operator selectable modes of the multi-mode radar system disclosed herein.

TABLE I

Common Operator Selectable Modes

| Patrol Vehicle | Type of Signal(s) | Receding/Approaching |
|---|---|---|
| Stationary | Closest and Faster | Approaching |
| Stationary | Closest and Faster | Receding or Approaching |
| Stationary | Closest and Faster | Receding |
| Stationary | Closest | Approaching |
| Stationary | Closest | Receding or Approaching |
| Stationary | Closest | Receding |
| Moving | Closest and Faster | Approaching |
| Moving | Closest and Faster | Receding or Approaching |
| Moving | Closest and Faster | Receding |
| Moving | Closest | Approaching |
| Moving | Closest | Receding or Approaching |
| Moving | Closest | Receding |

With respect to the forward-facing antenna 32, the officer operating the vehicular traffic surveillance Doppler radar system is intending to target vehicle 26 which is a small sports car having a relatively small radar cross-section ($\sigma_1$). The forward-facing antenna 32 emits double-modulated FM signals that spread less than ten degrees from an axis of the forward-facing antenna 32. It should be appreciated that although the present invention is described as utilizing double-modulated FM signals, other types of modulated FM signals may be utilized. For example, triple and higher order modulated FM signals may be utilized. In one embodiment, the double-modulated FM signals are a continuous wave signal transmission that is alternated between a first and second frequency. The double-modulated FM signals reflect off of the vehicle 26 and the vehicle 24 which is a large truck having a relatively large radar cross-section ($\sigma_2$), wherein $\sigma_2 \gg \sigma_1$. Hence, the vehicle 24 has a stronger reflected signal than the vehicle 26 even though the vehicle 24 is farther away from the patrol vehicle 30 than the vehicle 26. The reflected double-modulated FM signals generated by the vehicles 24 and 26 are received by the forward-facing antenna 32 and processed to resolve the multiple targets by determining the direction, speed, and range of the targeted vehicles 24 and 26.

As will be discussed in further detail hereinbelow, the vehicular traffic surveillance Doppler radar system receives the reflected double-modulated FM signals and performs a quadrature demodulation on the reflected double-modulated FM signals. In one embodiment, homodyne reception is utilized wherein a voltage having the original carrier frequency is generated and combined with the incoming reflected double-modulated FM signals. The quadrature demodulated, reflected FM signals are then converted to digital signals and a fast Fourier transform (FFT) is performed that results in an approaching or closing target spectrum and a receding or opening target spectrum. In one implementation, a complex FFT is performed on the data. Analysis of the resulting spectra using the multi-direction sensing capabilities of the instant police radar indicates that both of the vehicles 24 and 26 are approaching. The frequency signal differentials associated with each target are also analyzed to determine that the vehicle 24 is traveling at 75 mph and the vehicle 26 is traveling at 55 mph. The phase angle signal differentials associated with each of the targets are analyzed to determine that the vehicle 26 is closer to the patrol vehicle 30 than the vehicle 24. The speed of the closest vehicle, i.e., vehicle 26, is indicated at the display 44 and the speed of the faster vehicle, i.e., vehicle 24, is indicated at display 46.

The police officer operating the vehicular traffic surveillance Doppler radar system uses the displayed information to determine that the closest target, which is vehicle 26, is traveling at 55 mph and a more distant target, which is vehicle 24, is traveling at 75 mph. Existing radar systems assume that the strongest target is the closest target; namely, the vehicle 26 in the illustrated example. Accordingly, if patrol vehicle 30 had been equipped with an existing radar system, then the vehicle 26 could have appeared to have been traveling 75 mph in a 55 mph zone. The vehicular traffic surveillance Doppler radar system presented herein avoids this false positive due to look-past error by calculating target ranges based upon the phase angle signal differentials associated with the targets rather than assuming signal strength is indicative of range and, in particular, the strongest signal is from the closest vehicle.

With respect to the rear-facing antenna 34, the officer operating the vehicular traffic surveillance Doppler radar system is intending to target vehicle 22. The emitted double-modulated FM signals reflect from the vehicle 22 and the vehicle 28 which is heading south in the southbound lane 18. The reflected double-modulated FM signals are processed to determine the direction, speed, and range of the targets. The vehicle 28 is receding from the patrol vehicle 30, so the speed and range of the vehicle 28 are ignored since the vehicular traffic surveillance Doppler radar system is an approaching only mode. The speed, 50 mph, and range, 300 ft, of the vehicle 22 are determined and the display 48 indicates that the closest vehicle is traveling at 50 mph. The police officer uses the displayed information to determine that vehicle 22 is traveling at 50 mph.

Further, the vehicular traffic surveillance Doppler radar system includes safety features that determine if conditions are safe for the patrol vehicle 30 to pull-out in front of oncoming traffic based on the speed and range of the oncoming vehicles. Based on the speed (50 mph) and the range (300 ft) of the vehicle 22, the vehicular traffic surveillance Doppler radar system determines that conditions are hazardous and a collision with vehicle 22 is possible if the patrol vehicle 30 pulls into the northbound lane 14. In one implementation, to indicate that conditions are hazardous and a collision is possible, the vehicular traffic surveillance Doppler radar system provides a visual indication via collision avoidance indicator 42 and an audio indication via speaker 40 to the police officer operating the vehicular traffic surveillance Doppler radar system.

Figure 1B:
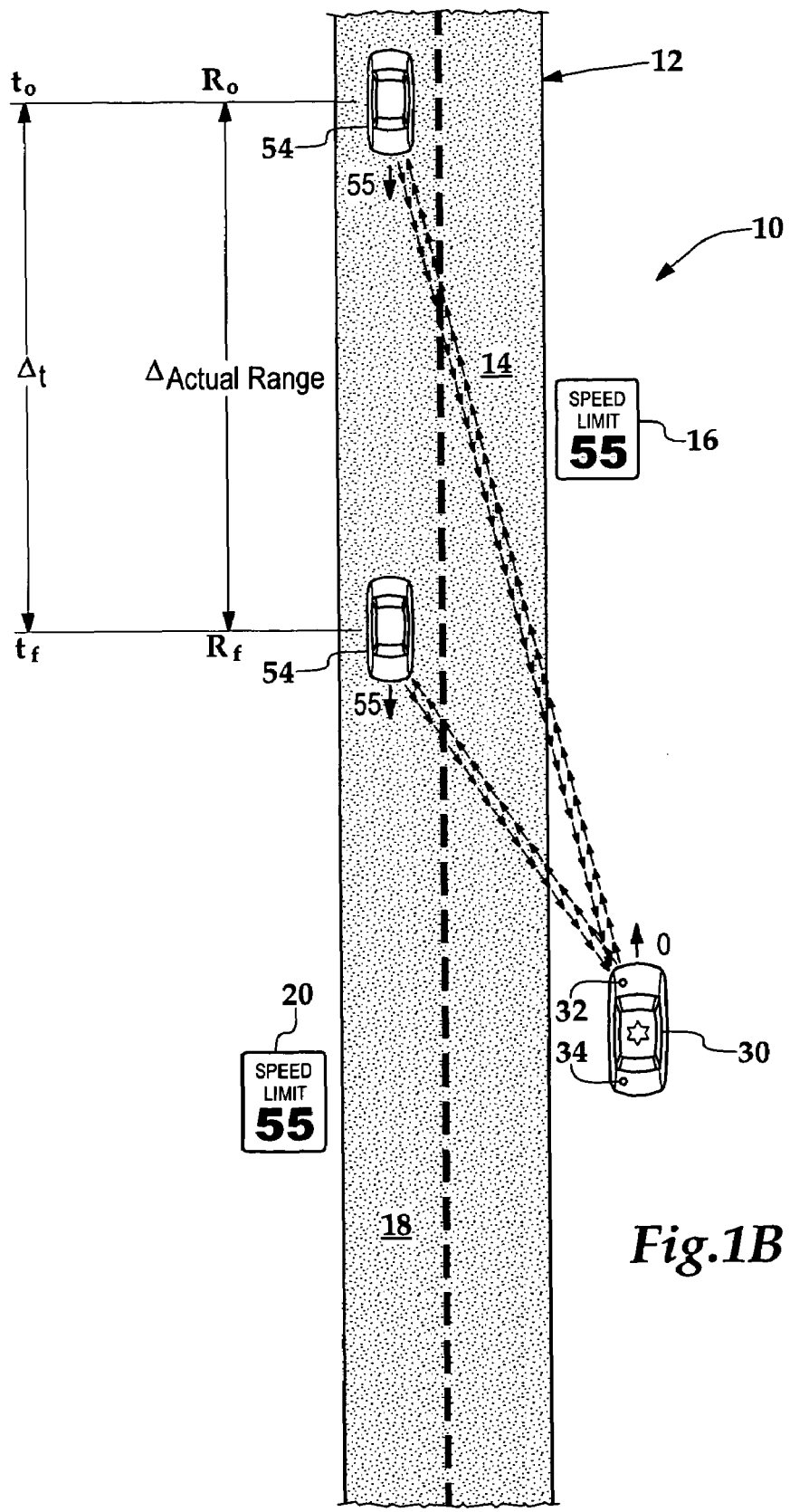
FIG. 1B depicts a schematic illustration of a single vehicle environment wherein one embodiment of a system for calibrating a vehicular traffic surveillance Doppler radar is being utilized.

FIG. 1B depicts the environment 10 of FIG. 1A wherein one embodiment of a system for calibrating a vehicular traffic surveillance Doppler radar is being utilized. Periodically, after the expiration of a predetermined period of time, the Doppler radar of patrol vehicle 30 self-calibrates its range determining function which, as previously alluded to, determines range by utilizing phase angle signal measurements.

As illustrated, the patrol vehicle 30 is monitoring a vehicle 54 traveling at a speed of 55 mph in the southbound lane 18. Initially at time $t_0$, the vehicle 54 is at an initial range, $R_0$. Forward-facing antenna 32 transmits a continuous FM signal to the vehicle 54 and receives a reflected double-modulated signal therefrom. The frequency signal differentials associated with the signals are analyzed to determine that the vehicle is traveling at 55 mph. In particular, when the double-modulated FM signal is reflected from the vehicle 54, the frequency of the reflected double-modulated FM signal is shifted in proportion to a component of the velocity of the vehicle 54. The shift or frequency signal differential between the double-modulated FM signal and the reflected double-modulated FM signal provides the speed of vehicle 55.

Further, the phase angle differentials associated with the reflected double-modulated signal are analyzed to determine that the vehicle 54 is at a range of $R_0$. More specifically, the range, $R_0$, is related to the change in phase, $\Delta_{phase}$, in the reflected double-modulated signal by the following equation:

$$R_0 = (\Delta_{phase} * c) / (4\pi(f_2 - f_1))$$

wherein $f_1$ and $f_2$ are the frequencies utilized in the double-modulated signal. For example, if the change in phase, $\Delta_{phase}$, of the received reflected double-modulated signal is +/−180° and $f_1$=34.7 gHz and $f_2$=34.7001 gHz, then the range, $R_0$, of the vehicle 54 is 2,460 ft.

At time $t_f$, the vehicle has traveled toward the patrol vehicle 30 and is at a range of $R_f$. The continuous FM signal is transmitted to the target 54 and a reflected double-modulated signal is received. The frequency signal differentials associated with the signals are analyzed to determine that the vehicle is traveling at 55 mph and the phase angle differentials associated with the reflected double-modulated signal are analyzed to determine that the vehicle 54 is at a range of $R_f$. To calibrate the Doppler radar, the distance the vehicle 54 traveled, d, from time $t_0$ to time $t_f$ is determined by multiplying the speed, v, of the vehicle by delta time, $\Delta t = t_f - t_0$, as follows:

$$d = v * \Delta t$$

Additionally, the change in actual range, $\Delta_{Actual\ Range}$, is determined by taking the difference of the final range, $R_f$, and the initial range, $R_0$, as follows for a closing target vehicle:

$$66_{Actual\ Range} = R_0 - R_f$$

In the illustrated example, the vehicle 54 is traveling at 55 mph at $t_0$ and $t_f$. It should be appreciated that if the speed of the vehicle is different at $t_0$ and $t_f$, then the range may be called by integrating the speeds of the target vehicle over the time interval.

The distance, d, and the change in the actual range, $\Delta_{Actual\ Range}$, are compared and the Doppler radar is appropriately calibrated. In one embodiment, if the distance, d, is greater than the actual range, $\Delta_{Actual\ Range}$, then an under modulation condition is present wherein the Doppler radar requires calibration by tightening or decreasing the difference between the double modulated frequencies, $f_1$ and $f_2$. If the distance, d, is less than the actual range, $\Delta_{Actual\ Range}$, then an over modulation condition is present wherein the difference between the double modulated frequencies, $f_1$ and $f_2$, needs to be increased. If the distance, d, is equal to the actual range, $\Delta_{Actual\ Range}$, then the modulation condition and the double modulation frequencies, $f_1$ and $f_2$, should be maintained. As will be described in further detail hereinbelow, the Doppler radar utilizes an oscillator having a frequency versus voltage characteristic to generate the double modulated frequencies, $f_1$ and $f_2$. By utilizing this arrangement, the voltages supplied to the oscillator via a calibration signal determine the frequencies generated.

Figure 2:
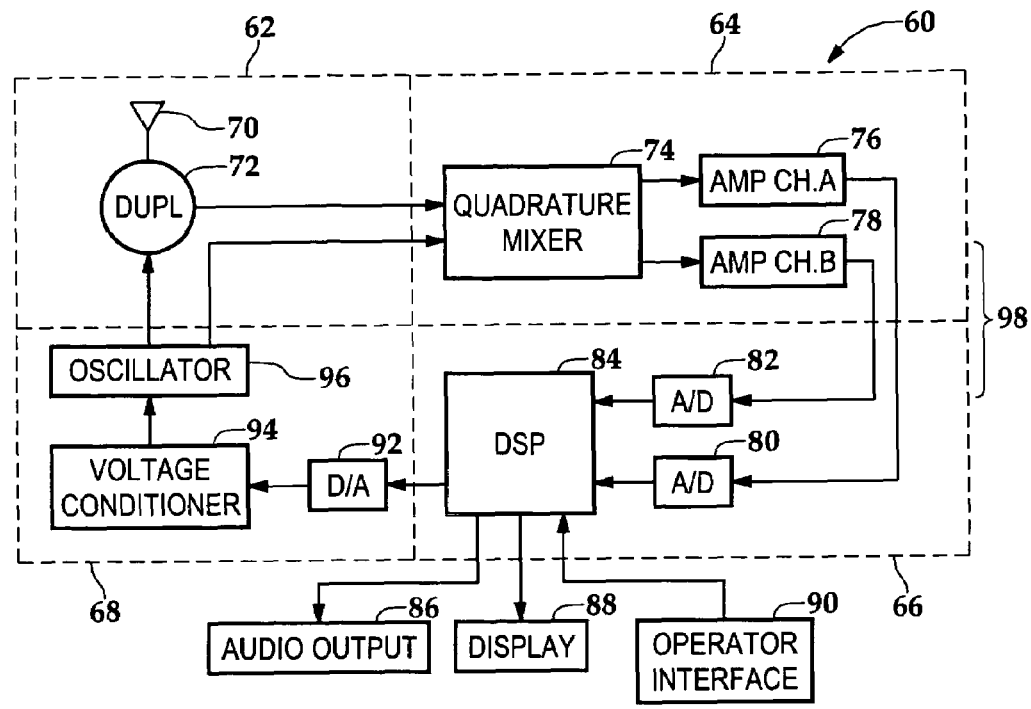
FIG. 2 depicts a schematic diagram of one embodiment of the vehicular traffic surveillance Doppler radar system.

FIG. 2 depicts one embodiment of the vehicular traffic surveillance Doppler radar system which is generally designated 60. The vehicular traffic surveillance Doppler radar system includes an antenna circuit portion 62, a quadrature circuit portion 64, a processing circuit portion 66, and a modulation circuit portion 68. The antenna circuit portion 62 includes an antenna 70 that transmits outgoing radar waves in the form of double-modulated FM signals and receives reflected double-modulated FM signals from stationary and moving objects including intended and unintended target vehicles. A duplexer 72 guides the outgoing double-modulated FM signals from the modulation circuit portion 68 to antenna 70 and guides reflected radar waves received by antenna 70 to the quadrature circuit portion 64.

The quadrature circuit portion 64 includes a quadrature mixer 74 coupled to the duplexer 72 in order to receive the reflected double-modulated FM signals. The quadrature circuit portion 64 is also coupled to the modulation circuit portion 68 in order to receive a local oscillator signal. As will be explained in further detail in FIG. 3, the quadrature mixer 74 performs a quadrature demodulation by mixing the local oscillator signal with incoming RF of reflected radar waves in two separate mixers in two separate channels such that one channel is shifted by 90° relative to the other channel. The quadrature demodulation results in a channel A signal that is driven to amplifier 76 and a channel B signal that is driven to amplifier 78. Preferably, amplifiers 76 and 78 are matched, low noise amplifiers. The amplified channel A and B signals are driven to the processing circuit portion 66 and received by analog-to-digital (A/D) converters 80 and 82, respectively. The A/D converters 80 and 82 sample the analog signals from amplifiers 76 and 78, respectively, and output the sampled signals as digital data sampled signals on one or more transmission paths, such as busses, infrared (IR) communication paths, or cables, connected to a digital signal processor (DSP) 84.

The DSP 84 processes the digital data samples from channels A and B by performing a FFT thereon to develop the aforementioned approaching target Fourier spectrum and receding target Fourier spectrum. The target Fourier spectra are searched for targets and the direction each target is traveling relative to the patrol vehicle is identified. Data associated with the spectra is further analyzed to determine the speeds of the identified targets based upon frequency signal differentials associated with the targets. Additional information regarding the direction and speed sensing capabilities of the radar system of the present invention may be found in the following co-owed United States patents: (1) U.S. Pat. No. 6,198,427, entitled "Doppler Complex FFT Police Radar With Direction Sensing Capability," issued on Mar. 6, 2001 in the names of Aker et al.; and (2) U.S. Pat. No. 6,646,591, entitled "Doppler Complex FFT Police Radar With Direction Sensing Capability," issued on Nov. 22, 2003 in the names of Aker et al.; both of which are hereby incorporated by reference for all purposes.

The range of the identified targets is calculated based upon a phase angle signal differential associated with the targets. With regard to a particular target, the phase angle is arbitrary. However, the difference between the phase angle for the particular target with respect to a first set of data and the phase angle for the particular target with respect to a second set of data is indicative of the range between the police radar of the present invention and the particular target. Further information regarding the target range capabilities of the radar system of the present invention may be found in the following commonly owned, co-pending patent application; "Vehicular Traffic Surveillance Doppler Radar System," filed on Feb. 16, 2005, application Ser. No. 11/059,476, in the name of John L. Aker; which is hereby incorporated by reference for all purposes.

Target metrics, such as direction, speed, and range, determined by the DSP 84 are provided to the operator via an audio output 86 and a display 88, which, in one implementation, may be control unit 36 of FIG. 1. An operator interface 90, which may include front panel or remote controls, provides for general operation of the system including operator selectability of the aforementioned multiple modes of operation.

A D/A convertor 92 receives multiple digital signals from the DSP 84 and converts these signals to a voltage which is supplied to a voltage conditioner 94. As will be discussed in further detail hereinbelow, the voltage conditioner 94 may be a voltage regulator or varactor device, for example. Operating in combination with the converter 92, the voltage conditioner 94 provides two voltages to an oscillator 96 that, in turn, generates the double-modulated FM signals. In particular, a frequency versus voltage characteristic that is associated with the oscillator 96 is utilized to generate two frequencies with only a relatively small difference in the applied voltages. In one embodiment, the DSP 84 determines the required calibration and generates a calibration signal indicative of the voltages required to generate the desired frequencies. The calibration signal is received by the D/A converter 92, which in combination with the voltage conditioner 94, applies the two voltages to the oscillator 96 that generate the desired double-modulated frequency.

In one implementation, the oscillator 96 comprises a dielectric resonator oscillator (DRO) or a Gunn diode oscillator that utilizes a negative resistance property of bulk gallium arsenide (GaAs) to convert an applied DC voltage into microwave power. Further information regarding the modulation circuit portion 68 may be found in the following commonly owned, co-pending patent application: "Modulation Circuit for a Vehicular Traffic Surveillance Doppler Radar System," filed on Feb. 16, 2005, application Ser. No. 11/059,199, in the name of John L. Aker; which is hereby incorporated by reference for all purposes.

Periodically, the Doppler radar 60 self-calibrates by transmitting double-modulated FM signals to a target and receiving reflected double-modulated FM signals therefrom. The quadrature circuit portion 64 and the processing circuit portion 66, which together may be referred to as a calibration circuit portion 98, respond to the reflected double-modulated FM signals by determining the required calibration and sending the calibration signal to the modulation circuit portion 68. The calibration signal is indicative of a relationship between a first range measurement derived from phase angle measurements associated with the reflected double-modulated FM signals and a second range measurement derived from speed and time measurements associated with the reflected double-modulated FM signals.

It should be appreciated by those skilled in the art that although a particular arrangement of circuitry has been illustrated with respect to the radar system of the present invention, the radar system of the present invention may comprise any combination of hardware, software, and firmware. In particular, each of the circuit portions 62, 64, 66, and 68 of the present invention may comprise any combination of hardware, software, and firmware.

Figure 3:
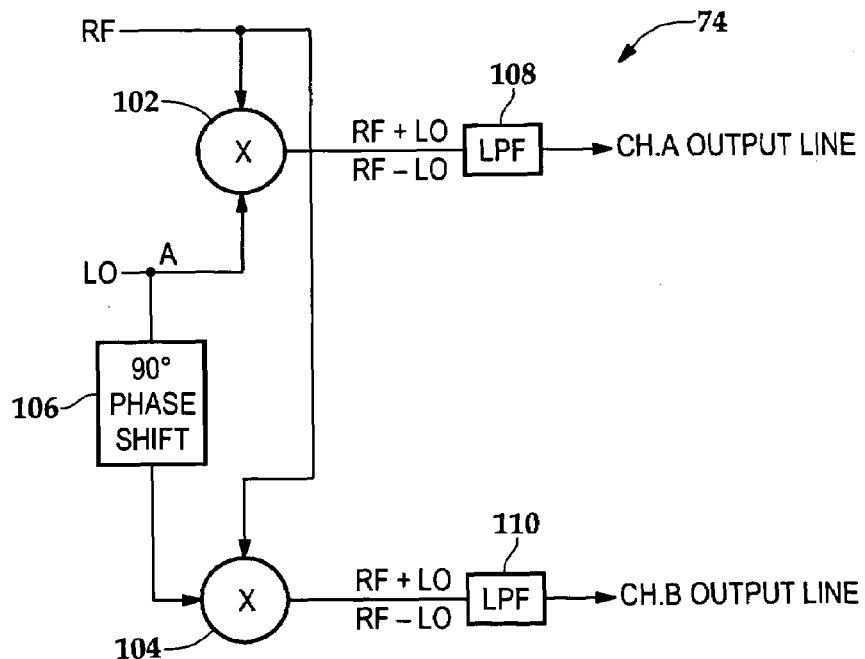
FIG. 3 depicts a schematic diagram of one embodiment of a quadrature mixer for the vehicular traffic surveillance Doppler radar system.

FIG. 3 depicts one embodiment of the quadrature mixer 74. As previously discussed, the function of the quadrature mixer 74 is to mix local oscillator energy with incoming RF of reflected radar waves in two separate mixers in two separate channels and shift one channel 90° relative to the other channel. Incoming RF from the duplexer 72 is provided to a channel A mixer 102 and a channel B mixer 104. Local oscillator (LO) energy arrives from oscillator 96 and is provided as a second input to mixer 102. The local oscillator energy is also coupled to a second input of mixer 104 via a phase shifter 106 which, in the illustrated embodiment, is a 90° phase shifter. The phase shifter 106 shifts the local oscillator signal by 90°, or any integer multiple of 90°, in either direction relative to the local oscillator signal. In alternative embodiments, instead of shifting the local oscillator signal by 90°, the incoming RF can be shifted by 90° at the input of one mixer relative to the same incoming RF at the input of the other mixer.

The 90° phase shift can be achieved in any known manner associated with quadrature demodulation. In the preferred embodiment, the 90° phase shift is achieved by having a microwave transmission line which is one-quarter wavelength (at the frequency of operation) longer in the path from the local oscillator or RF input to one mixer than it is in the path to the other mixer. By way of example, other techniques such as reactive circuits or delay lines may also be used.

The mixers 102 and 104 modulate the local oscillator signals with the Doppler shifted RF signals reflected from stationary and moving objects and output sum and difference frequencies on a channel A output line and a channel B output line. Low pass filters 108 and 110 are coupled to the channel A and B output lines, respectively, in order to remove the upper sideband (local oscillator plus Doppler shifted RF) signals from each of the spectrum on the channel A and B output lines so that only the difference frequencies are outputed. Preferably, to reduce errors and noise, the mixers 102 and 104 and low pass filters 108 and 110 are matched as closely as possible since amplitude variations between channels A and B may cause noise in the system.

Figure 4:
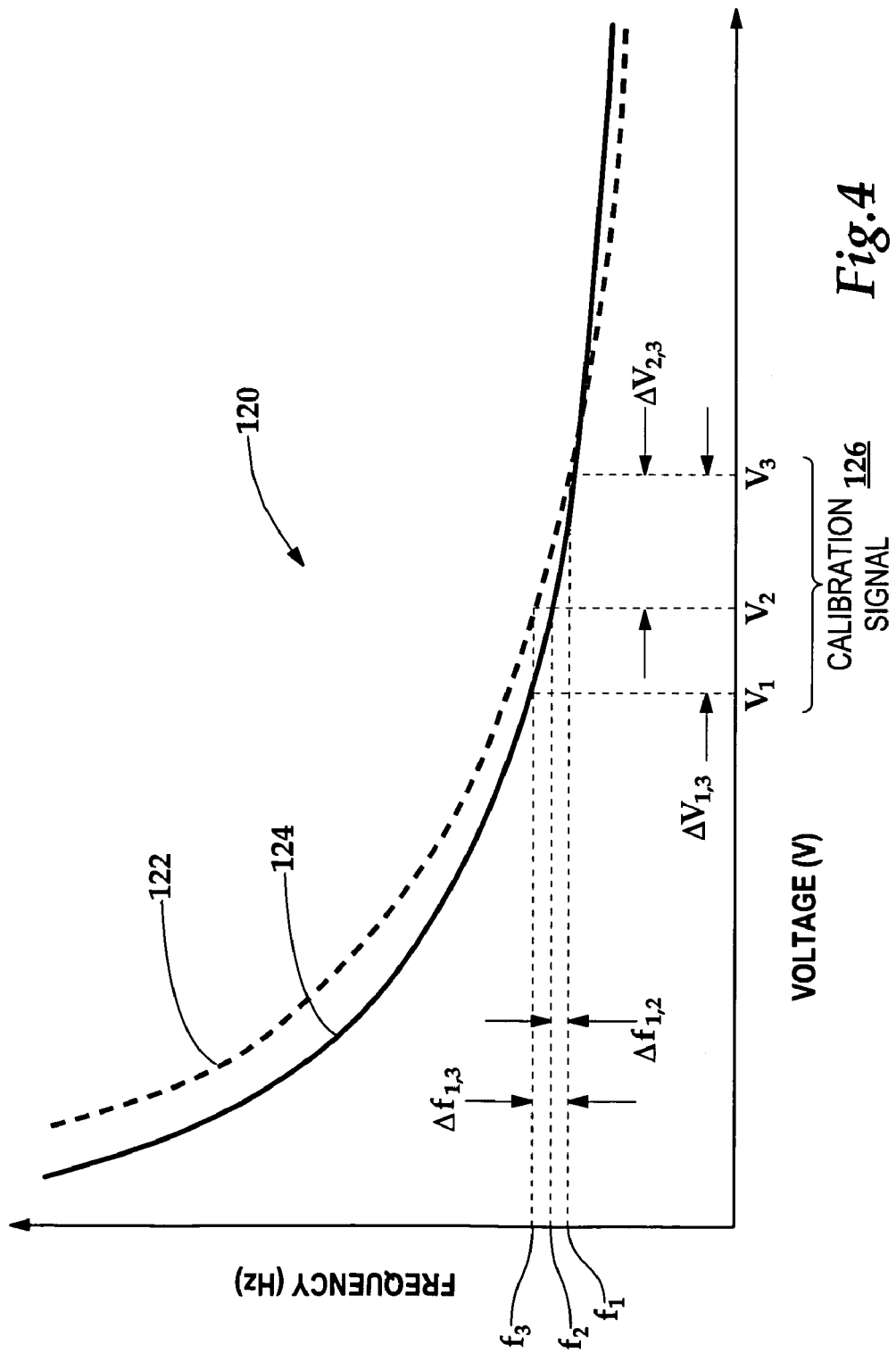
FIG. 4 depicts a graph of frequency versus voltage illustrating one embodiment of the calibration of a frequency versus voltage characteristic associated with the Doppler radar.

FIG. 4 depicts a graph 120 of frequency (Hz) versus voltage (V) illustrating one embodiment of calibration of the Doppler radar. Frequency versus voltage characteristics 122 and 124 each specify non-linear, temperature dependent relationships between the input voltages applied to the oscillator and the resulting double-modulated FM signals generated by the Doppler radar. Initially, the Doppler radar has characteristic 122 which is illustrated with the dashed curve. Voltages $V_2$ and $V_3$ are applied to the oscillator to generate a double-modulated FM signal having frequencies $f_1$ and $f_3$. Doppler radar self-calibration indicates that the frequency differential of $\Delta f_{1,3}$ results in an accurate range determining functionality.

Due to changes in temperature, the characteristic 122 changes to characteristic 124 which is illustrated with the solid curve. The change in temperature may be the result of heat generated by the use of the Doppler radar. By way of another example, the change in temperature may the result of a change in ambient conditions. With respect to the characteristic 124, the application of voltages $V_2$ and $V_3$ to the oscillator results in the generation of frequencies $f_1$ and $f_2$ and a frequency differential of $\Delta f_{1,2}$.

Doppler radar self-calibration indicates that the Doppler radar is in an over modulation condition wherein the Doppler radar is overestimating the range of a target vehicle. To calibrate the Doppler radar, a greater voltage differential needs to be applied to the oscillator so that the frequency differential is increased to $\Delta f_{1,3}$ for example. The Doppler radar generates a calibration signal 126 which adjusts the applied voltages to $V_1$ and $V_3$. This results in a frequency differential of $\Delta f_{1,3}$ that provides accurate determination of range as verified by Doppler radar self-calibration. In one implementation, the under modulation and over modulation conditions are partially corrected in a series of iterations since the frequency versus voltage characteristics associated with the oscillator are non-linear.

Figure 5:
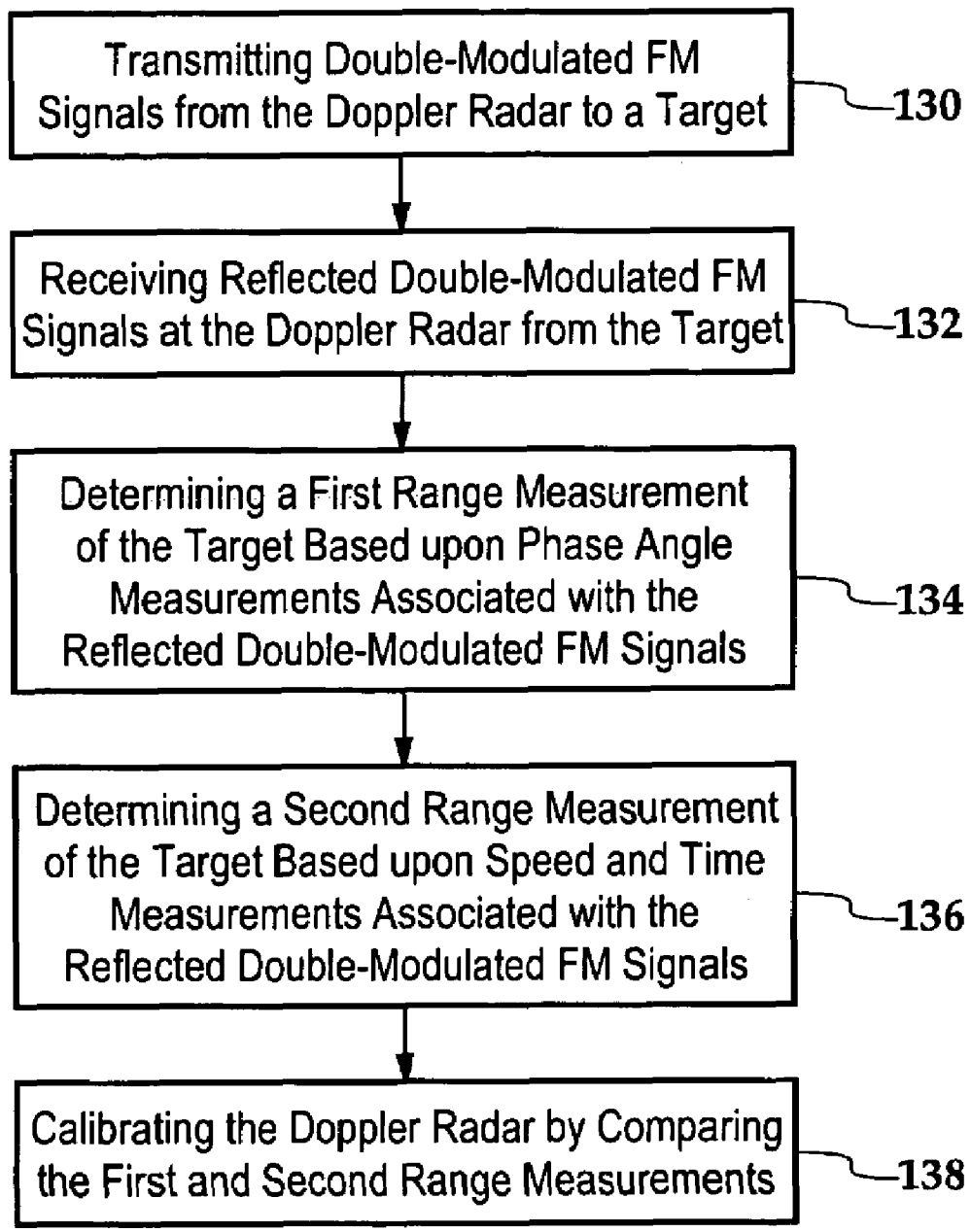
FIG. 5 depicts a flow chart of one embodiment of a method for calibrating a vehicular traffic surveillance Doppler radar.

Referring now to FIG. 5, one embodiment of a method for calibrating a vehicular traffic surveillance Doppler radar is depicted. At block 130, double-modulated FM signals are transmitted from the Doppler radar to a target vehicle. At block 132, reflected double-modulated FM signals are received at the Doppler radar from the target vehicle. At block 134, a first range measurement of the target vehicle is determined based upon phase angle measurements associated with the reflected double-modulated FM signals. At block 136, a second range measurement of the target vehicle is determined based upon speed and time measurements associated with the reflected double-modulated FM signals. At block 138, the Doppler radar is calibrated by comparing the first and second range measurements. As previously discussed, a calibration signal is generated that may correct for over modulation or under modulation conditions associated with the Doppler radar and, in particular, the oscillator. Additionally, the calibration signal may maintain the modulation condition by maintaining the voltages applied to the oscillator.

Figure 6:
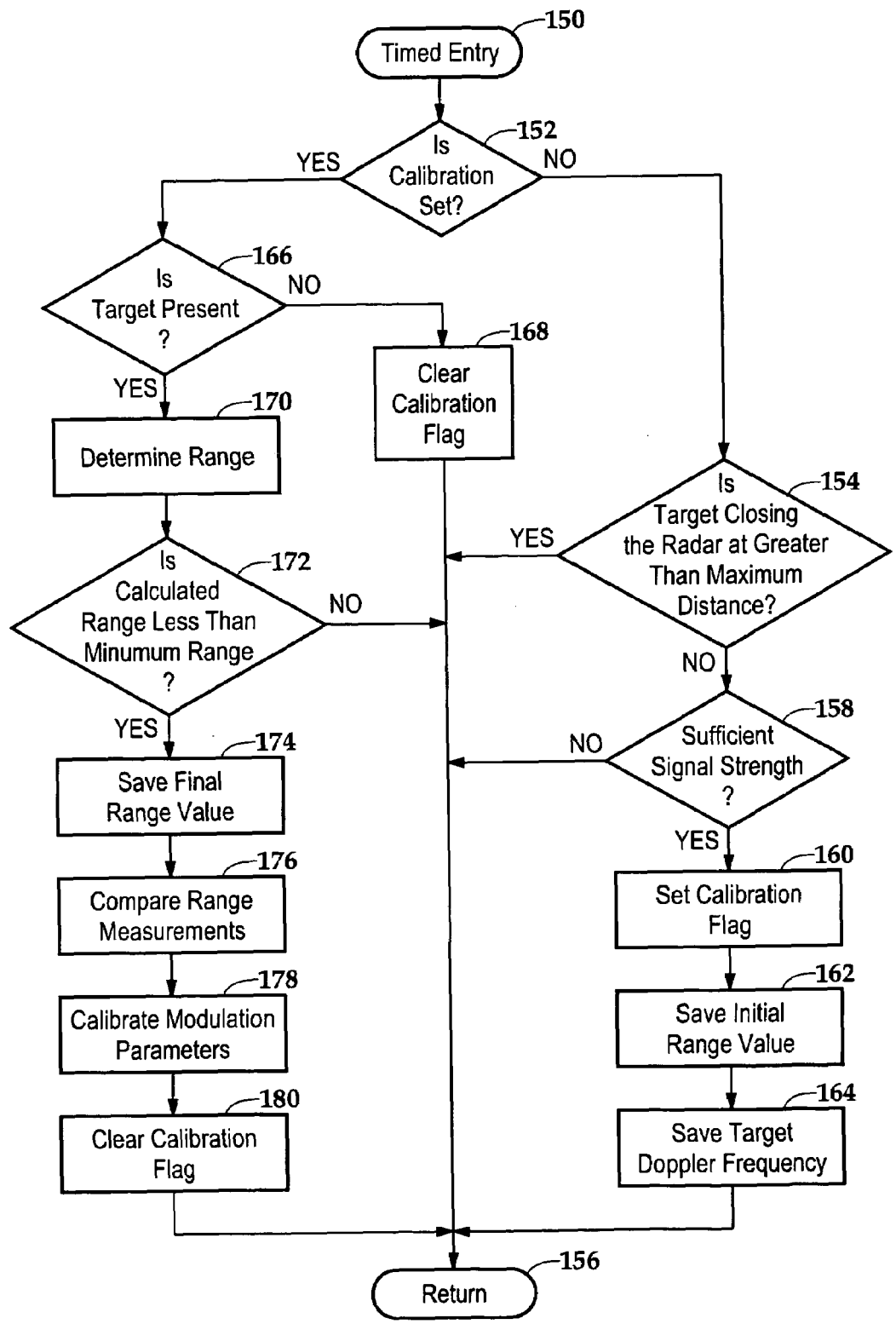
FIG. 6 depicts a flow chart of another embodiment of a method for calibrating a vehicular traffic surveillance Doppler radar.

FIG. 6 depicts another embodiment of a method for calibrating a vehicular traffic surveillance Doppler radar. At block 150, a calibration routine is called. In one implementation, the calibration routine is effectuated as instructions that are periodically processed by a DSP, such as DSP 84 of FIG. 2. The calibration routine determines if a calibration flag is set at decision block 152. If the calibration flag is not set, then the methodology continues by searching the target FFT spectrum to find an acceptable closing target. As previously discussed, reflected doubled-modulated FM signals are processed by the quadrature mixer and following an analog-to-digital conversion, digital data is sampled from the quadrature mixer. The DSP performs a FFT on the sampled digital data to develop the target FFT spectrum.

At decision block 154, the target FFT spectrum is searched to find a target vehicle. If the target vehicle is present in the target FFT spectrum at a range greater than the maximum distance, then the methodology continues to block 156 wherein the routine ends. In order to calibrate the Doppler radar, the target vehicle must be at a distance that is less than a maximum distance. If such a target vehicle is present at a distance less than the maximum, then the methodology continues to block 158 where the signal strength of the target is determined to ensure a signal having low range jitter.

If the signal strength is not sufficient, then the methodology advances to block 156. Otherwise, at block 160, the calibration flag is set. At block 162, the initial range value (e.g., $R_0$) is calculated and saved. At block 164, information associated with the target Doppler frequency is saved. At block 156, the methodology returns to block 150.

Returning to decision block 152, if the calibration flag is set, then the process advances to decision block 166 wherein if the target vehicle is not present then the calibration flag is cleared at block 168 before the methodology ends at block 156. If the target is present, then the target's range is determined at block 170. Additionally, the target's distance traveled (e.g., d) is determined at block 170 based on the target vehicle's speed and the time lapsed since the initial range value was saved at block 162. At decision block 172, if the calculated range is not less than a minimum range, then the process ends at block 156. On the other hand if the calculated range is less than the minimum range, then the final range value (e.g., $R_f$) and the distance measurement are saved at block 174. At block 176, the difference of the range measurements (e.g., $R_0 - R_f$ for a closing target or $R_f - R_0$ for an opening target) are compared to the distance the target vehicle traveled. At block 178, based on modulation parameters associated with the DSP, a calibration signal is generated and the Doppler radar is calibrated. The calibration signal may correct an over or under modulation condition or the calibration signal may maintain the frequencies of the double-modulated FM signal. The calibration flag is cleared at block 180 before the methodology ends at block 156.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for calibrating a vehicular traffic surveillance Doppler radar, the system comprising:
   a modulation circuit portion for generating modulated FM signals;
   an antenna circuit portion for transmitting the modulated FM signals to a target and receiving reflected modulated FM signals therefrom; and
   a calibration circuit portion, responsive to the reflected modulated FM signals, for determining a calibration signal and sending the calibration signal to the modulation circuit portion, where the calibration circuit portion determines the calibration signal by comparing a first range measurement derived from phase angle measurements associated with the reflected modulated FM signals and a second range measurement derived from speed and time measurements associated with the reflected modulated FM signals.

2. The system as recited in claim 1, wherein the modulated FM signals form a portion of a continuous FM signal.

3. The system as recited in claim 1, wherein the modulated FM signals comprise double-modulated FM signals.

4. The system as recited in claim 1, wherein the modulation circuit portion comprises an oscillator selected from the group consisting of dielectric resonator oscillators and Gunn diode oscillators.

5. The system as recited in claim 1, wherein the antenna circuit portion comprises a duplexer coupled to an antenna, the duplexer guiding the modulated FM signals from the modulation circuit portion to the antenna and guiding the reflected modulated FM signals from the antenna to the calibration circuit portion.

6. The system as recited in claim 1, wherein the calibration circuit portion comprises:
a quadrature circuit portion coupled to the antenna circuit portion and the modulation circuit portion, the quadrature circuit portion for performing a quadrature demodulation using the reflected modulated FM signals; and
a processing circuit portion, responsive to the quadrature demodulation, for performing a fast Fourier transform analysis to determine the first range measurement and the second range measurement.

7. The system as recited in claim 1, wherein the calibration signal adjusts applied voltages of an oscillator frequency versus voltage characteristic associated with the modulation circuit portion.

8. The system as recited in claim 7, wherein the oscillator frequency versus voltage characteristic comprises a non-linear, temperature dependent relationship between the applied voltages and the modulated FM signals.

9. The system as recited in claim 1, wherein the calibration signal corrects an over modulation condition associated with the modulation circuit.

10. The system as recited in claim 1, wherein the calibration signal corrects an under modulation condition associated with the modulation circuit.

11. The system as recited in claim 1, wherein the calibration signal maintains modulation conditions associated with the modulation circuit.

12. A method for calibrating a vehicular traffic surveillance Doppler radar, method system comprising:
transmitting modulated FM signals from the Doppler radar to a target;
receiving reflected modulated FM signals at the Doppler radar from the target;
determining a first range measurement of the target based upon phase angle measurements associated with the reflected modulated FM signals;
determining a second range measurement of the target based upon speed and time measurements associated with the reflected modulated FM signals; and
calibrating the Doppler radar by comparing the first and second range measurements.

13. The method as recited in claim 12, wherein transmitting the modulated FM signals further comprises transmitting a continuous FM signal including the modulated FM signals.

14. The method as recited in claim 12, wherein transmitting the modulated FM signals further comprises transmitting double-modulated FM signals from the Doppler radar to the target.

15. The method as recited in claim 12, wherein transmitting the modulated FM signals further comprises transmitting modulated FM signals from the Doppler radar to a target in response to an expiration of a predetermined period of time.

16. The method as recited in claim 12, further comprising correcting an over modulation condition associated with the Doppler radar.

17. The method as recited in claim 12, further comprising correcting an under modulation condition associated with the Doppler radar.

18. The method as recited in claim 12, further comprising maintaining modulation conditions associated with the Doppler radar.

19. A system for calibrating a vehicular traffic surveillance Doppler radar, method system comprising:
means for transmitting modulated FM signals from the Doppler radar to a target and receiving reflected modulated FM signals therefrom;
means for determining a first range measurement of the target based upon phase angle measurements associated with the reflected modulated FM signals;
means for determining a second range measurement of the target based upon speed and time measurements associated with the reflected modulated FM signals; and
means for calibrating the Doppler radar by comparing the first and second range measurements.

20. The system as recited in claim 19, wherein the means for transmitting the modulated FM signals further comprises means for transmitting a continuous FM signal including the modulated FM signals.

21. The system as recited in claim 19, wherein the means for transmitting modulated FM signals further comprises means for transmitting double-modulated FM signals from the Doppler radar to the target.

22. The system as recited in claim 19, wherein the means for transmitting the modulated FM signals further comprises means for transmitting modulated FM signals from the Doppler radar to a target in response to an expiration of a predetermined period of time.

23. The system as recited in claim 19, further comprising means for correcting an over modulation condition associated with the Doppler radar.

24. The system as recited in claim 19, further comprising means for correcting an under modulation condition associated with the Doppler radar.

25. The system as recited in claim 19, further comprising means for maintaining modulation conditions associated with the Doppler radar.

26. A system for vehicular traffic surveillance, the system comprising:
a Doppler radar that transmits modulated FM signals and receives reflected modulated FM signals; and
a target vehicle that generates the reflected modulated FM signals in response to the modulated FM signals,
wherein the Doppler radar self-calibrates by utilizing a calibration circuit portion to compare a first range measurement derived from phase angle measurements associated with the reflected modulated FM signals and a second range measurement derived from speed and time measurements associated with the reflected modulated FM signals.

27. The system as recited in claim 26, further comprising a police vehicle onto which the Doppler radar is mounted.

28. The system as recited in claim 26, wherein the Doppler radar self-calibrates to correct an over modulation condition in a frequency versus voltage characteristic associated with the Doppler radar.

29. The system as recited in claim 26, wherein the Doppler radar self-calibrates to correct an under modulation condition in a frequency versus voltage characteristic associated with the Doppler radar.

30. The system as recited in claim 26, wherein the Doppler radar self-calibrates and maintains modulation conditions associated with a frequency versus voltage characteristic of the Doppler radar.

31. The system as recited in claim 26, wherein the modulated FM signals form a portion of a continuous FM signal.

32. The system as recited in claim 26, wherein the modulated FM signals comprise double-modulated FM signals.

* * * * *